United States Patent [19]

Taylor

[11] 4,178,121
[45] Dec. 11, 1979

[54] REPETITIVE-CYCLE OBJECT HANDLING APPARATUS

[75] Inventor: Leonard H. Taylor, High Wycombe, England

[73] Assignee: Perkin-Elmer Limited, Beaconsfield, Great Britain

[21] Appl. No.: 944,817

[22] Filed: Sep. 22, 1978

Related U.S. Application Data

[63] Continuation of Ser. No. 776,941, Mar. 14, 1977, abandoned.

[51] Int. Cl.² .............................................. B65G 57/00
[52] U.S. Cl. ..................................... 414/104; 221/268; 414/108; 414/119
[58] Field of Search .................... 214/6 F, 6 D, 8.5 F, 214/6 BA, 7; 221/268–276, 232,

[56] References Cited

U.S. PATENT DOCUMENTS

| | | | |
|---|---|---|---|
| 1,513,248 | 10/1924 | Johnson | 221/269 |
| 2,549,975 | 4/1951 | Knitter | 414/96 |
| 2,940,327 | 6/1960 | Gartner | 414/96 |
| 3,335,699 | 8/1967 | Aiken et al. | 414/92 |
| 4,024,966 | 5/1977 | Schenck | 414/108 |
| 4,053,242 | 10/1977 | Mast, Jr. | 221/232 |

Primary Examiner—Joseph F. Peters, Jr.
Assistant Examiner—Ross Weaver
Attorney, Agent, or Firm—Salvatore A. Giarratana; Francis L. Masselle; Edwin T. Grimes

[57] ABSTRACT

Repetitive-cycle object handling apparatus which includes, in combination, a feed station for accommodating a stack of slab-like objects of regular geometry, which are subjected to a feed force acting in the longitudinal direction thereof; a utilization station where objects fed seriatim from the feed station may be made to dwell before being moved on; a storage station for stacking one object at a time after the object has dwelled at the utilization station for a predetermined time interval; object transfer apparatus for sliding out a leading object from the stack at the feed station to the utilization station and, at the end of the predetermined time interval, to move the object on to the storage station; an object stacking ramp for guiding an object leaving the utilization station toward a stacking attitude at the storage station under the action of the object transfer apparatus; and preferably the apparatus further includes an object fulcrum disposed downstream of the object stacking ramp for enabling an object to be swung therearound to said stacking attitude under the action of a bias force after the bias force has first been overcome by the transfer apparatus and a sufficient portion of the object has progressed beyond the fulcrum.

15 Claims, 6 Drawing Figures

REPETITIVE-CYCLE OBJECT HANDLING APPARATUS

This is a continuation of application Ser. No. 776,941, filed Mar. 14, 1977, now abandoned.

BACKGROUND OF THE INVENTION

This invention relates to repetitive-cycle object handling apparatus, and more particularly, to the type thereof which is arranged for transferring slab-like stacked objects of regular geometry one by one from a feed station to a utilization station and thence to a storage station for stacking.

Apparatus constructed in accordance with the concepts of the present invention are particularly adapted, among other possible uses, for use in conjunction with spectrophotometers.

The phrase "regular geometry" as employed in this application is intended to refer to slab-like objects having at least approximately identical contour, such as square or rectangular for example, but not necessarily identical thickness. In fact, one of the features of the present invention resides in the fact that it enables objects to be handled which have varying thicknesses, within a predetermined range.

The term "autosampler" as employed in this application and as understood in the spectrophotometric art, and the like, refers to a device which is designed to present analytical samples one by one from a feed station to a utilization station, such as a sample analysis station for example, either at the will of the operator or in an independently controlled timed sequence.

While many different types of autosamplers have been used heretofore, the present contribution to the art is a new autosampler which is an improvement over such prior art apparatus, as will become apparent as the description proceeds.

SUMMARY OF THE INVENTION

It is one object of the present invention to provide a repetitive-cycle object handling apparatus capable of transferring objects of regular geometry but different thickness from a feed station to a storage station, with an intervening dwell at a utilization station, and to stack them at the storage station.

In the specific application of the invention to an autosampler as referred to, one would naturally strive to utilize the sampling capacity of the device to the fullest extent. This means that each sample holder should be no greater in size then the nature of the sample required. It is an object of the present invention to provide an autosampler capable of handling sample holders of varying thicknesses and in any random order in which they may have been stacked.

Further, it is an object of the invention to provide an autosampler which is reliable so that it may be operated unattended for long periods of time. Heretofore, difficulties were experienced in stacking sample holders at a storage station after they had passed through an analysis station. As a consequence, it is another object of the present invention to provide a stacking arrangement which is based on the use of simple guideways, instead of mechanisms requiring the cooperation of cams, stacking fingers and the like elements involving fine adjustment and frequent repairs.

In order to accomplish the desired results, this invention in one form thereof provides a new and improved repetitive-cycle object handling apparatus which comprises, in combination, a feed station for accomplishing a stack of slab-like objects of regular geometry, means for subjecting the stack to a feed force acting in the longitudinal direction of the stack, and a utilization station where objects fed seriatim from the feed station may be made to dwell before being moved on. In addition, the apparatus includes a storage station for stacking one object at a time after the object has dwelled at the utilization station for a predetermined time interval. The apparatus further includes object transfer means for sliding out a leading object from a stack at the feeding station to the utilization station and, at the end of said predetermined time interval, to move the object on to the storage station. According to the invention, an object stacking ramp is provided for guiding an object leaving the utilization station toward a stacking attitude at the storage station under the action of the object transfer means. In addition, means are provided for subjecting the stack of objects in the storage station to a bias force substantially in the longitudinal direction of the stack, and object fulcrum means are disposed downstream of the object stacking ramp for enabling an object to be swung therearound to said stacking attitude under the action of said bias force, after the bias force has first been overcome by the transfer means and a predetermined portion of the object has progressed beyond the fulcrum.

According to an aspect of the invention, the apparatus may further include a stacking plateau disposed substantially normal to the longitudinal axis of the stacking space at the storage station for determining the stacking attitude of an object abutting thereagainst, said plateau being disposed adjacent the ramp to form a corner therebetween which constitutes the object fulcrum means.

Apparatus according to the invention may include, in one of its forms, automatic gating means for preventing more than one object at a time from leaving the feed station, regardless of the relative thickness of the objects. This automatic object gating means may comprise resilient means for providing, edgewise of an object, a fractional resistance to transfer that can only be overcome by a force greater than that which is sufficient to overcome the frictional engagement between contacting faces in the stack that is due to the feed force, so that only the leading object, which has the full force supplied by the object transfer means behind it, is enabled to move forward. In another form of the invention, the utilization station may include means for defining a datum plane and means for urging an object face-on in abutment with said datum plane means while the object is progressing through, or dwelling at, the said utilization station.

Still further, in a form of the invention, the storage station may include an object guidance means for allowing sufficient lateral play for an object to swing around in stacking attitude regardless of its thickness and for gradually reducing said play as the stack is built up so as to reduce any stagger in the alignment of the stacked objects and prevent any object that has reached the stacking attitude from tilting significantly from the normal to the longitudinal axis of the stack.

According to another aspect of the invention, the transfer means may include a transfer slide reciprocatable through Scotch yoke-type means driven through a linkage by an electric motor. The transfer means is arranged for the performance of a transfer cycle in which the transfer resistance peak met in the stacking operation at the storage station approximately corresponds to the occurrence of a mechanical advantage peak of said transfer means, resulting from the action of the yoke means.

There has been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based may readily be utilized as the basis of the designing of other structures for carrying out the various purposes of the invention. It is important, therefore, that this disclosure be regarded as including such equivalent constructions as do not depart from the spirit and scope of the invention.

Several embodiments of the invention have been chosen for purposes of illustration and description, and are shown in the accompanying drawings forming a part of the specification.

DETAILED DESCRIPTION OF THE PREFERRED EMBODIMENTS

In the embodiment illustrated in FIGS. 1 to 5, the repetitive-cycle object handling apparatus includes a feed station that is generally indicated at 1 and comprises two side walls 1A and 1B and a bottom wall 1C, which together essentially defined a U-shaped channel. A storage station, generally indicated at 2, comprises two side walls 2A and 2B and a bottom wall 2C, so as to define a similar U-shaped channel.

Figure 1:
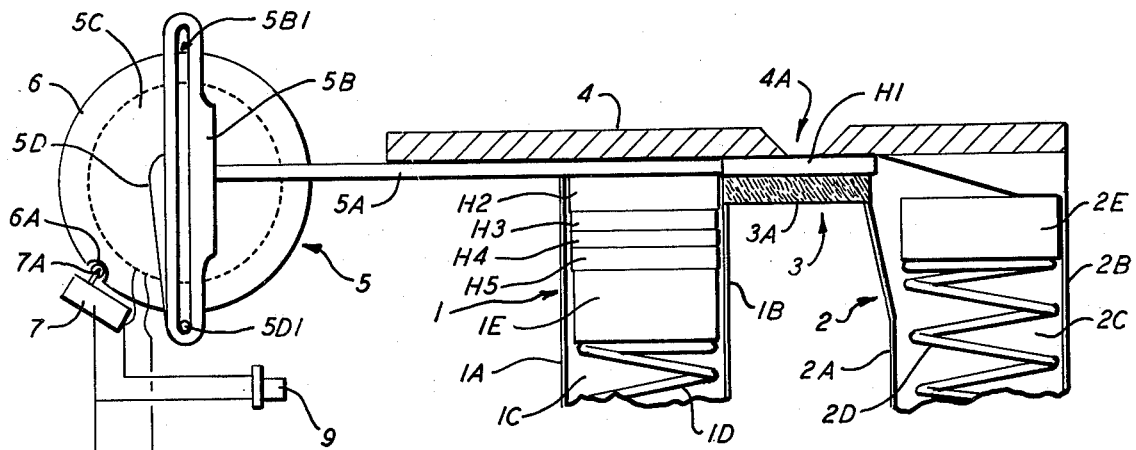
FIGS. 1 to 5 are plan views, partially in section and partially schematic, of a repetitive-cycle object handling apparatus constructed in accordance with the concepts of the invention, and showing the sequence of operation as an object passes through the apparatus.

A stack of sample holders H2, H3, H4 and H5 is shown at the feed station 1, FIG. 1, the stack being held under a slight compressive force by a spring 1D of substantially constant force acting through a sliding compression block 1E to provide the stack feed force. Means, not shown, are provided for resisting the reaction of the spring 1D, such as, for example, an end wall disposed transversely of the walls 1A and 1B. The sample holders are of generally square configuration and are geometrically identical, except that they vary in thickness in order to accommodate samples with different cross-sectional requirements, e.g., foils as compared to liquids. The sample holders are inserted from the top of the feed station, after pulling back the sliding compression block 1E.

The storage station 2, as seen in FIG. 1, includes a sliding compression block 2E, of a suitable low-friction synthetic plastic material, held under slight compression by a spring 2D of substantially constant force, which is the counterpart of the spring 1D.

A sample analysis station is generally indicated at 3, and comprises a portion of a baffle wall 4, having an opening 4A providing access to a photometric beam of a spectrophotometer, not shown, a lower friction pad 3A, and an upper friction pad (not shown in the embodiment of FIGS. 1 to 5) spaced from the pad 3A a distance approximately equal to the height of one sample holder. This element will be discussed more fully in connection with the description of the embodiment of FIG. 6.

A slide transfer mechanism, generally indicated at 5, comprises a flat transfer slide 5A rectilinearly reciprocatable in abutment with the rear face of the baffle wall 4 by a Scotch yoke device 5B linked to an electric motor 5C. Means (not shown in the embodiment of FIGS. 1 to 5) are provided for confining the motion of the transfer slide 5A to a rectilinear path, as will be discussed more fully hereinafter in connection with the embodiment of FIG. 6. A crank 5D provides a mechanical linkage between the motor 5C and the Scotch yoke 5B. One end of the crank is fixed to the shaft of the motor 5C and the other end thereof is provided with a pin 5D1 for engaging in a longitudinal slot 5B1 of the Scotch yoke 5B. Keyed to the shaft motor 5C, just below the crank arm 5D, is an aluminum disc 6 provided with a semicircular cut-away 6A, in which a follower 7A of a microswitch 7 is resiliently urged, when the apparatus is in its position as illustrated in FIG. 1. When the follower 7A rides on the edge of the disc 6, the microswitch 7 is closed to thereby connect an A.C. power supply 8 to the motor windings. When the follower 7A drops into the cut-away 6A, the circuit is broken. A push-button type switch 9 is connected across the terminals of the microswitch 7 to enable the operator to override the microswitch.

When the elements are in their positions as illustrated in FIG. 1, transfer mechanism 5 is in its rest position, corresponding to the end of a transfer cycle, with one sample holder H1 transferred from the feed station 1 to the sample analysis station 3. After the spectrum of the sample in the holder has been obtained, the operator may initiate the next transfer cycle by depressing the switch 9, with the result that the microswitch 7, which is in the off condition at this stage because its follower 7A is located in the cut-away 6A, is by-passed and the power supply is conducted to the motor 5C. The motor 5C is arranged to rotate in an anticlockwise direction, as viewed in FIG. 1. As the motor rotates, the pin 5D1 travels along the length of the slot 5B1 and thus pushes the transfer mechanism 5 to the right, as viewed in FIG. 1. The transfer slide 5A in turn pushes the sample holder H1 to the right, as viewed in FIG. 1, for stacking at the storage station 2. The beginning of this operation is illustrated in FIG. 2.

Figure 2:
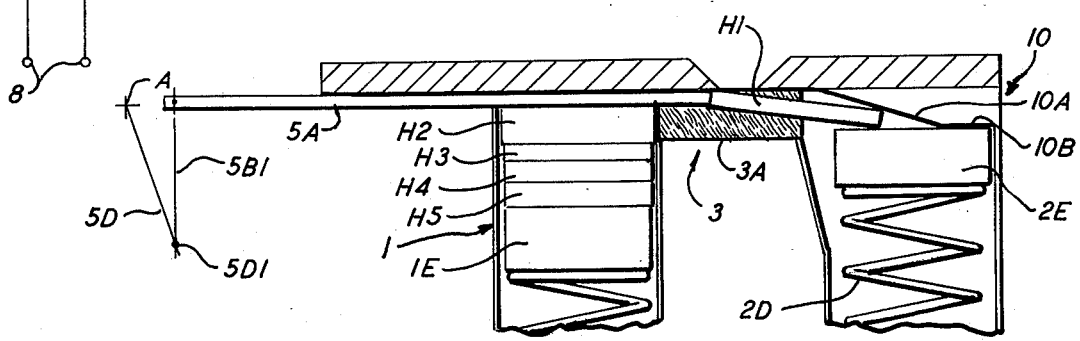

In FIGS. 2 to 5, the crank arm 5D and the slot 5B1 in the yoke 5B are schematically illustrated, and the axis of the motor 5C is indicated at A. In FIG. 2, as the holder H1 begins to move out of the sample analysis station 3, the leading side thereof meets a generally wedge-shaped block 10, comprising an inclined portion serving as a stacking ramp 10A and a flat portion serving as a stacking plateau 10B, and begins to climb the stacking ramp 10A, with the lower corner of the leading side approaching the compression block 2E, shown in abutment with the stacking plateau 10B under the action of the spring 2D.

Figure 3:
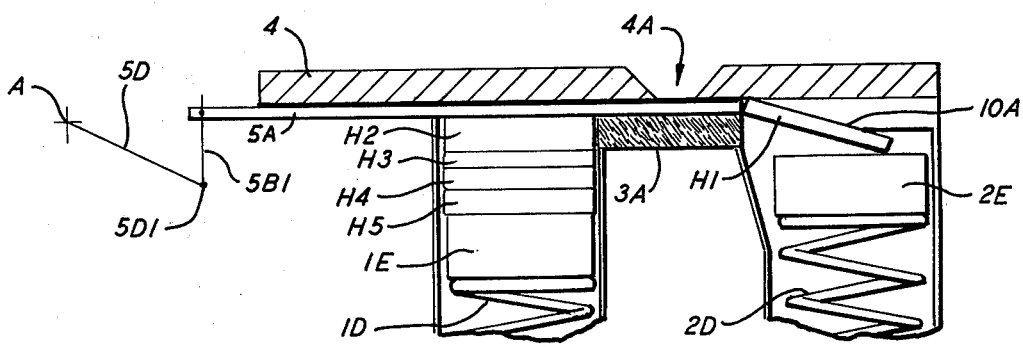

As the transfer slide 5A approaches the end of its forward travel, the operational stage as shown in FIG. 3 is reached, wherein said corner of the holder H1 has come into contact with the compression block 2E; the force applied by the spring 2D has been overcome by the transfer force transmitted through the transfer slide 5A; the compression block 2E has been pushed back into the storage station by an amount determined by the thickness of the holder H1; and the holder H1 is now lying flat against the ramp 10A. It is noted that the leading longitudinal end of the slide 5A and the trailing side of the holder H1 are still in contact, although very nearly at the point of separating.

Figure 4:
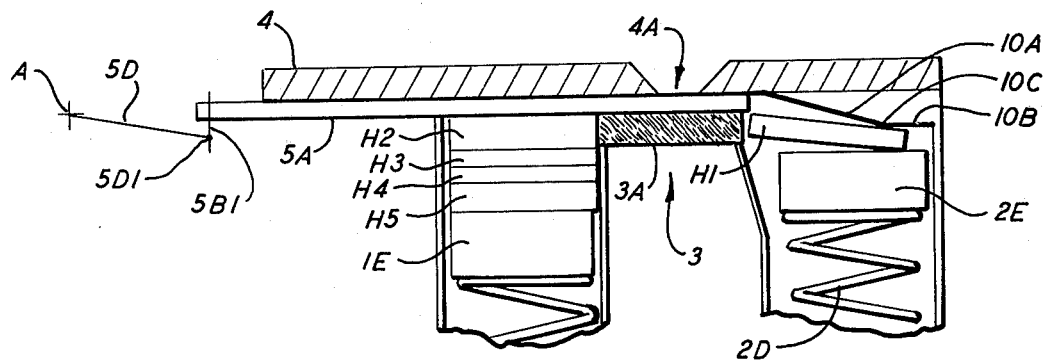

In FIG. 4, the forward stroke of the transfer slide 5A is rapidly reaching its end and the trailing side of the holder H1 is free from the leading end of the transfer slide 5A. The leading side of the holder H1 has now moved well forward of the corner between the stacking ramp 10A and the stacking plateau 10B, said corner representing in effect the object fulcrum 10C. It will be appreciated that the holder H1 may be considered as a lever having a short arm extending from the object fulcrum 10C to the line of contact between the compression block 2E and the lower corner of the leading side of the holder. The block transmits to this corner the force applied by the spring 2D, with the result that the holder H1 must swing around the fulcrum 10C until the short arm referred to abuts against the plateau 10B. When this movement is completed, the holder H1 is in its stacking attitude. It is noted that the change in level between the station 3 and the plateau 10B must be made no less than the thickness of the thickest holder, or otherwise, the holder cannot be stacked without interfering side-on with the last stacked holder at the storage station.

It will be appreciated that the force required throughout the stacking stroke reaches a peak at the stage illustrated in FIG. 3, when the force supplied by the spring 2D must be overcome in order to push back the compression block 2E. Because the effective length of the slot 5B1 is altered from the beginning to the end of the stacking stroke, the mechanical advantage improves as the pin 5D1 moves closer to the transfer slide 5A, at the expense of the displacement rate of the transfer slide 5A, until just past its position as shown in FIG. 4 the crank arm 5D is aligned with the transfer slide 5A and the end of the stroke is reached.

Figure 5:
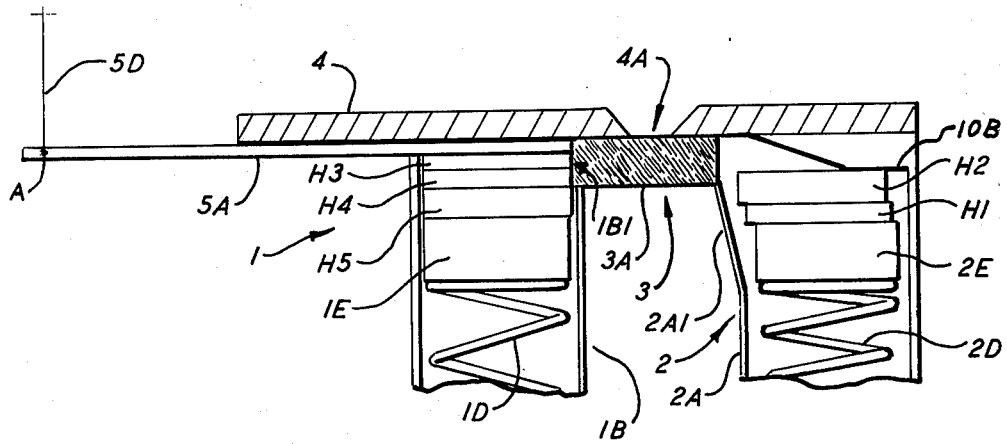

During the next quarter turn of the crank arm 5D, the transfer slide 5A retracts to the position shown in FIG. 5, and in a further quarter turn, it falls back to a position just behind the feed station 1, thus reaching the end of the return stroke, with the crank arm 5D in line with the transfer slide 5A. The crank continues to rotate to begin the forward stroke of the transfer slide.

One of the features embodied in the storage station 2 is the provision of an inclined portion 2A1 in wall 2A to form a stacking guide, as shown in FIG. 5. As each successive sample holder is brought into a stacking attitude, similarly to slides H1 and H2, there is a tendency for a stagger to develop in the building up of the stack. This is corrected by the inclined stacking guide 2A1, which exerts a converging action on each holder that has swung around as it progresses through the growing stack. However, the stacking guide 2A1 must provide sufficient clearance at its free end to allow the holders to turn around unimpeded as each moves from the transfer slide 5A and snaps onto the plateau 10B.

In addition, means are provided for gating the sample holder so that only the leading holder at the feed station is transferred to the sample analysis station at each transfer cycle. As best seen in FIG. 5, a first gating provision is effected by leaving a gap 1B1 between the rear face of the baffle wall 4 and the facing end of the wall 1B, which is just wide enough to allow the thickest sample holder to pass through wide adequate clearance.

The lower friction pad 3A spans in width the gap 1B1 and extends in length through the sample analysis station 3 up to the free end of the inclined stacking guide 2A1, but not beyond it or else it might interfere with the swinging action of the holder at the storage station. At the threshold of the gap 1B1, the pad 3A forms a resilient step which an advancing holder must overcome before it may proceed to the sample analysis station 3. When the transfer slide 5A is at the end of its return stroke, the sample holder H3 and H4 will have moved toward the baffle wall 4 by the thickness of the transfer slide 5A. This means that when the transfer slide 5A moves forward, the holder H3 is forcibly pushed along (the slide 5A being thinner than the thinnest holder) and the holder H4 may attempt to move forward by virtue of its frictional engagement with the holder H3, but unlike holder H3 it lacks the force behind it necessary to overcome the threshold provided across the gap 1B1 by the lower friction pad 3A and, therefore, remains stationary. It will thus be appreciated that, regardless of the order in which the holders of different thicknesses are stacked, a simultaneous transfer of more than one sample holder at a time is prevented. The friction pad 3A provides, in effect, a self-adjusting gating action.

In order to be sure that the sample within the sample holder is presented to the photometric beam passing through the window 4A is always, substantially in the correct plane, the sample holder entering the sample analysis station 3 is always kept in abutment with the rear face of the baffle wall 4. This is effected by providing the lower friction pad 3A with polypropylene fibres oriented at an angle of about 45 degrees with respect to the transfer slide 5A, with the free ends facing an oncoming sample holder. As the sample holder ploughs through the pad 3A, after having crushed the threshold at the gap 1B1, the ends of the fibres tend to oppose the progress of the holder and develop a component force which urges the holder toward the baffle wall 4. When the transfer to the sample analysis station 3 is completed, the holder remains firmly located in a temporary groove ploughed through the pad 3A. The upper friction pad (not shown in FIGS. 1 to 5 but shown in the embodiment of FIG. 6) acts in a similar manner.

For purposes of sensing a sample holder at the sample analysis station a window or cut-out (not shown in the embodiment of FIGS. 1 to 5 but shown in the embodiment of FIG. 6) may be provided in the friction pad 3A, through which the follower of a microswitch (not shown in the embodiment of FIGS. 1 to 5, but shown in the embodiment of FIG. 6) emerges slightly. As a sample holder is fed to the utilization station, the follower is depressed and the microswitch changes state, thereby indicating that a sample had in fact arrived at the sample analysis station.

Figure 6:
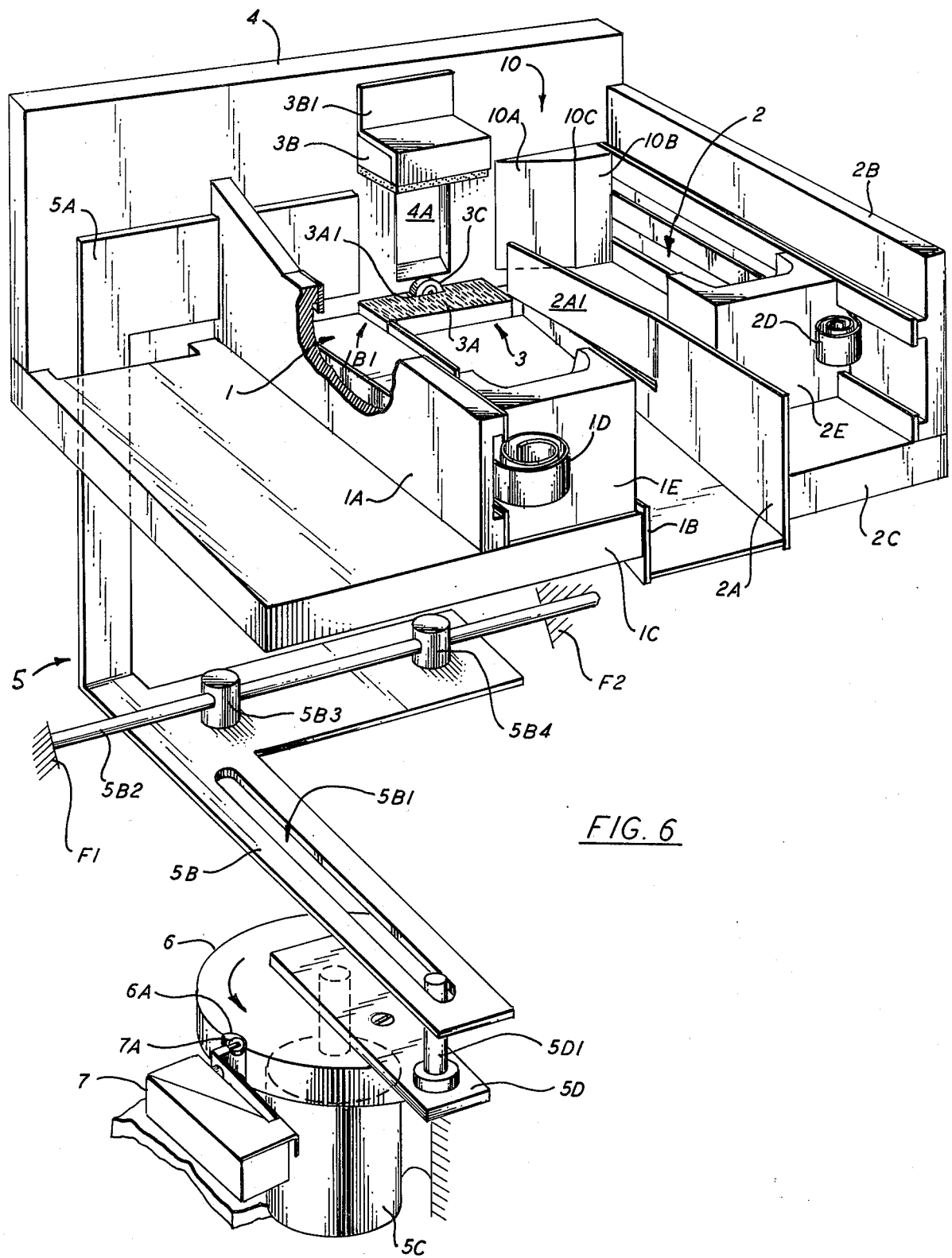
FIG. 6 is a perspective view of a preferred exemplary embodiment of apparatus according to the present invention.

Referring next to FIG. 6, this figure shows a practical embodiment of the autosampler shown in schematic form in FIGS. 1 to 5. Like reference numerals have been used for like elements in both embodiments. It will be noted that the transfer slide 5A and the Scotch yoke 5B have been formed integrally in a single unit 5 from a single piece of sheet metal bent to shape and slotted. In the embodiment of FIG. 6, a guide rod 5B2 is provided which has ends secured in the frame as indicated at F1 and F2. This guide rod cooperates with sliding bearings 5B3 and 5B4 secured to the unit 5, to thereby provide a rectilinear guideway for the slide transfer mechanism.

In FIG. 6 an upper friction pad 3B is illustrated. This friction pad is supported by a bracket 3B1 fixed to the rear of the baffle wall 4. As indicated in connection with the embodiment of FIGS. 1 to 5, the upper friction pad is provided with polypropylene fibres, or the like, which serve to develop a component force that urges the holder toward the baffle wall 4, and when the transfer to the sample analysis station is completed, the holder remains firmly located in a temporary groove ploughed through the pad. Further, in FIG. 6 there is shown a window or cut-out 3A1 in the lower friction pad 3A that accommodates therein a microswitch follower 3C for purposes of sensing when a sample holder has arrived in the sample analysis station.

In the embodiment of FIG. 6, the wall 1A is recessed to accommodate the extended length of a constant force Tensator spring indicated at 1D, the unextended free end thereof being clipped over the back of the block 1E. The wall 2B is similarly recessed for a Tensator spring 2D. It is noted that the wall 1B is quite low, and in fact it protrudes only slightly above the pad 3A. The gap 1B1 extends between the rear face of the baffle wall 4 and the vertical line in FIG. 6 denoting the boundary between the pad 3A and the wall 1B. As indicated with respect to the embodiment of FIGS. 1 to 5, this gap is provided as part of the gating means for the sample holders as they sequentially leave the feed station. Next, it will be noted that the motor 5C in the embodiment of FIG. 6 incorporates a speed reducing gear train, so that the crank 5D is not fixed to the motor shaft, but is fixed to the output shaft of said gear train. In other respects the embodiment of FIG. 6 is similar to that of FIGS. 1 to 5.

Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed is:

1. Repetitive-cycle object handling apparatus comprising, in combination:
   (a) a feed station for accommodating a stack of slab-like objects of regular geometry, means for subjecting said stack to a feed force acting in the longitudinal direction of said stack;
   (b) a utilization station where objects fed seriatim from the feed station may be made to dwell before being moved on;
   (c) a storage station for stacking one object at a time after the object has dwelled at the utilization station for a predetermined time interval;
   (d) object transfer means for sliding out a leading object from said stack at the feed station to the utilization station and, at the end of said predetermined time interval, to move said object on to the storage station;
   (e) an object stacking ramp for guiding an object leaving the utilization station toward a stacking attitude at the storage station under the action of said object transfer means;
   (f) means for subjecting the stack of objects in said storage station to a bias force substantially in the longitudinal direction of the stack; and
   (g) object fulcrum means disposed downstream of the centerline of the storage station stack and downstream of said object stacking ramp for enabling an object to be swung therearound to said stacking attitude under the action of said bias force after said bias force has first been overcome by said transfer means and a predetermined short portion of the object has progressed beyond said fulcrum.

2. Repetitive-cycle object handling apparatus according to claim 1 further comprising a stacking plateau disposed substantially normal to the longitudinal axis of the stacking space at the storage station for determining the stacking attitude of an object abutting thereagainst, said stacking plateau being disposed adjacent said ramp to form a corner therebetween which constitutes said object fulcrum means.

3. Repetitive-cycle object handling apparatus for automatically handling a plurality of objects of various thicknesses, in random order, comprising, in combination:
   (a) a feed station for accommodating a stack of slab like objects of regular geometry, means for subjecting said stack to a feed force acting in the longitudinal direction of said stack;
   (b) a utilization station where objects fed seriatim from the feed station may be made to dwell before being moved on;
   (c) a storage station for stacking one object at a time after the object has dwelled at the utilization station for a predetermined time interval;
   (d) object transfer means for engaging an edge of a leading object and sliding out the object from said stack at the feed station to the utilization station and, at the end of said predetermined time interval, to move said object on to the storage station;
   (e) an object stacking means for guiding an object leaving the utilization station toward a stacking attitude at the storage station under the action of said object transfer means; and
   (f) object gating means including stop means acting on an object abutting against the leading object at the feed station so as to impede the progress of the abutting object while allowing the leading object to be fed to the utilization station, said stop means adjusting its gating action in response to the relative thicknesses of the two objects.

4. Repetitive-cycle object handling apparatus according to claim 3 wherein said means for subjecting said stack to a feed force is a substantially constant force spring.

5. Repetitive-cycle object handling apparatus according to claim 3 wherein the utilization station is provided with means for defining a datum plane and means for urging an object faceon in abutment with said datum plane means while the object is progressing through, or dwelling at, the utilization station.

6. Repetitive-cycle object handling apparatus according to claim 3 wherein the object transfer means include means for converting rotary motion to rectilinearly reciprocating motion, said motion converting means being coupled to a rotary motor and being arranged to provide maximum mechanical advantage in the motion conversion near the point of engagement of the bias force.

7. Repetitive-cycle object handling apparatus according to claim 6 wherein the motion converting means is of the Scotch yoke type.

8. Repetitive-cycle object handling apparatus according to claim 3 wherein the transfer means are operative in successive identical cycles each of which begins and ends with the transfer means in the operative attitude associated with the completion of an object transfer from the feed station to the utilization station.

9. Repetitive-cycle object handling apparatus comprising, in combination:
(a) a feed station for accommodating a stack of slab-like objects of regular geometry, means for subjecting said stack to a feed force acting in the longitudinal direction of said stack;
(b) a utilization station where objects fed seriatim from the feed station may be made to dwell before being moved on;
(c) a storage station for stacking one object at a time after the object has dwelled at the utilization station for a predetermined time interval;
(d) object transfer means for sliding out a leading object from said stack at the feed station to the utilization station and, at the end of said predetermined time interval, to move said object on to the storage station; and
(e) automatic object gating means for preventing more than one object at a time from leaving the feed station, regardless of the relative thickness of the objects within predetermined limits, and automatic object gating means comprising, resilient means for providing, edgewise of an object, a frictional resistance to transfer that can only be overcome by a force greater than that which is sufficient to overcome the frictional engagement between contacting faces in the stack that is due to the feed force, so that only the leading object, which has the full force supplied by the object transfer means behind it, is enabled to move forward.

10. Repetitive-cycle object handling apparatus according to claim 9 wherein said resilient means extends through a major portion of the utilization station to assist in holding an object in position therein.

11. Repetitive-cycle object handling apparatus according to claim 10 wherein said utilization station has a fixed datum plane means, and wherein said resilient means is a friction pad having fibres oriented at an angle with respect to the movement of the object through the utilization station to resiliently urge the object against said fixed datum plane means.

12. Repetitive-cycle object handling apparatus according to claim 1 wherein said storage station includes object guidance means for allowing sufficient lateral play for an object to swing around in stacking attitude regardless of its thickness and for gradually reducing said play as the stack is built-up so as to reduce any stagger in the alignment of the stacked objects and prevent any object that has reached the stacking attitude from tilting significantly from the normal to the longitudinal axis of the stack.

13. Repetitive-cycle object handling apparatus according to claim 3 wherein said transfer means includes a transfer slide reciprocatable through yoke means driven through a linkage by an electric motor, said transfer means being arranged for the performance of a transfer cycle in which the transfer resistance peak met in the stacking operation at the storage station approximately corresponds to the occurrence of a mechanical advantage peak of said transfer means resulting from the action of the yoke means.

14. Repetitive-cycle object handling apparatus comprising, in combination:
(a) a feed station for accommodating a stack of slab-like objects of regular geometry, means for subjecting said stack to a force acting in the longitudinal direction of said stack;
(b) a utilization station where objects fed seriatim from the feed station may be made to dwell before being moved on;
(c) a storage station for stacking one object at a time after the object has dwelled at the utilization station for a predetermined time interval, said storage station including object guidance means for allowing sufficient lateral play for an object to swing around in stacking attitude regardless of its thickness and for gradually reducing said play as the stack is built-up so as to reduce any stagger in the alignment of the stacked objects and prevent any object that has reached the stacking attitude from tilting significantly from the normal to the longitudinal axis of the stack;
(d) object transfer means for sliding out a leading object from said stack at the feed station to the utilization station, and, at the end of said predetermined time interval, to move said object on to the storage station, said transfer means including a transfer slide reciprocatable through yoke means driven through a linkage by an electric motor, said transfer means being arranged for the performance of a transfer cycle in which the transfer resistance peak met in the stacking operation at the storage station approximately corresponds to the occurrence of a mechanical advantage peak of said transfer means resulting from the action of the yoke means;
(e) an object stacking ramp for guiding an object leaving the utilization station toward a stacking attitude at the storage station under the action of said object transfer means;
(f) object fulcrum means disposed downstream of said object stacking ramp for enabling an object to be swung therearound to said stacking attitude under the action of a bias force after said force has first been overcome by said transfer means and a sufficient portion of the object has progressed beyond said fulcrum means; and
(g) automatic object gating means for preventing more than one object at a time from leaving the feed station, regardless of the relative thickness of the objects within predetermined limits, said automatic object gating means including resilient means for providing, edgewise of an object, a frictional resistance to transfer that can only be overcome by a force greater than that which is sufficient to overcome the frictional engagement between contacting faces in the stack that is due to the feed force, so that only the leading object, which has the full force supplied by the object transfer means behind it, is enabled to move forward.

15. Repetitive-cycle object handling apparatus for automatically handling a plurality of objects of various thicknesses, in random order, in combination:
(a) a feed station for accommodating a stack of slab-like objects of regular geometry, means for subjecting said stack to a feed force acting in the longitudinal direction of said stack;
(b) a utilization station where objects fed seriatim from the feed station may be made to dwell before being moved on;
(c) a storage station for stacking one object at a time after the object has dwelled at the utilization station for a predetermined time interval;
(d) object transfer means for engaging an edge of a leading object and sliding out the object from said stack at the feed station to the utilization station and, at the end of said predetermined time interval, to move said object on to the storage station;

(e) an object stacking means for guiding an object leaving the utilization station toward a stacking attitude at the storage station under the action of said object transfer means;

(f) object gating means including stop means acting on an object abutting against the leading object at the feed station so as to impede the progress of the abutting object while allowing the leading object to be fed to the utilization station, said stop means adjusting its gating action in response to the relative thicknesses of the two objects; and (g) object fulcrum means disposed downstream of the centerline of the storage station stack and downstream of said object stacking ramp for enabling an object to be swung there-around to said stacking attitude under the action of said bias force after said bias force has first been overcome by said transfer means and a predetermined short portion of the object has progressed beyond said fulcrum.

* * * * *